May 24, 1966  C. M. MERKEL ETAL  3,252,409
FIXED BOX COTTON PRESS
Filed Feb. 6, 1964  8 Sheets-Sheet 1

INVENTOR.
CHARLES M. MERKEL
THOMAS H. BRUGH
BY Toulmin & Toulmin
ATTORNEYS

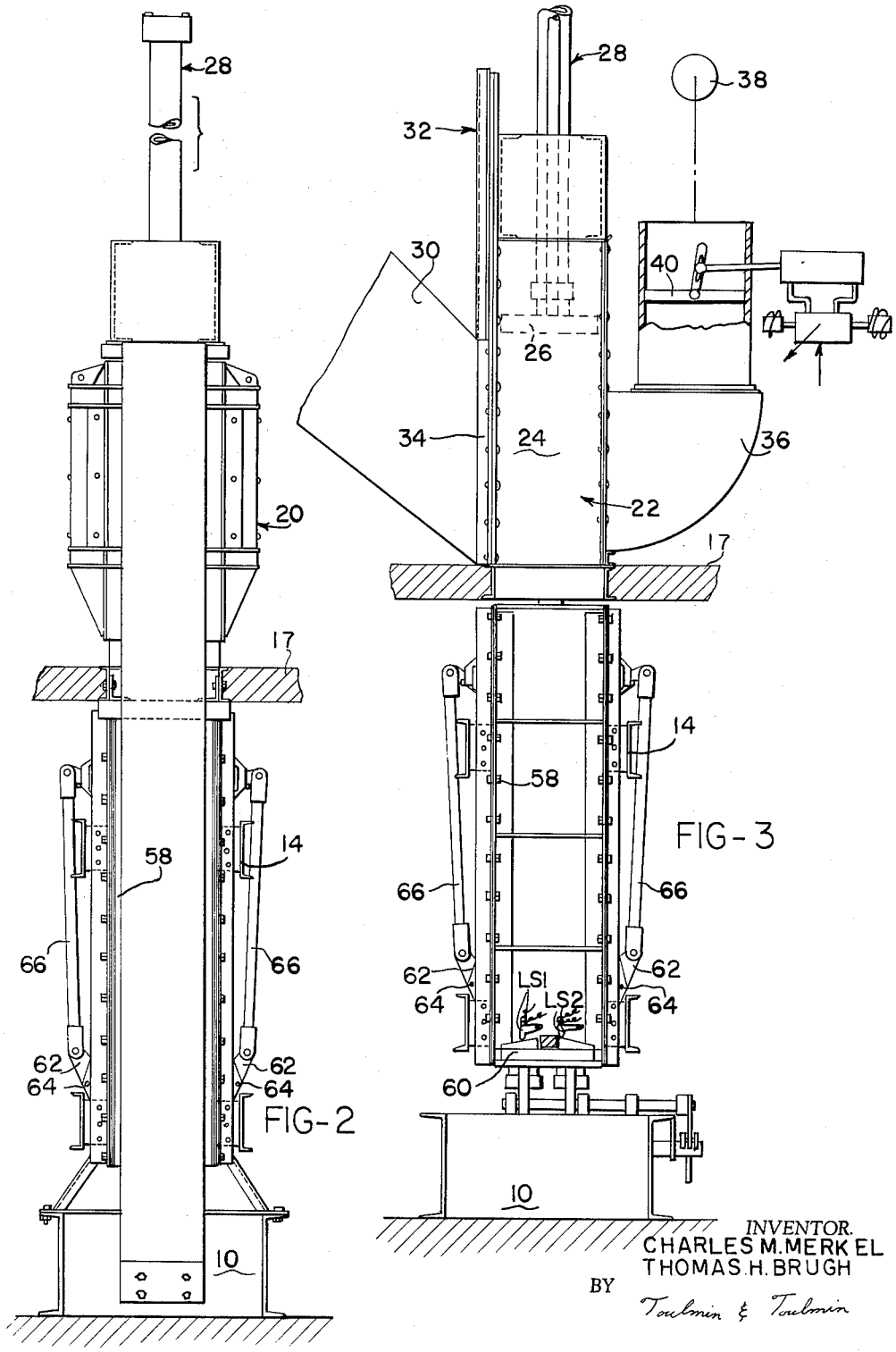

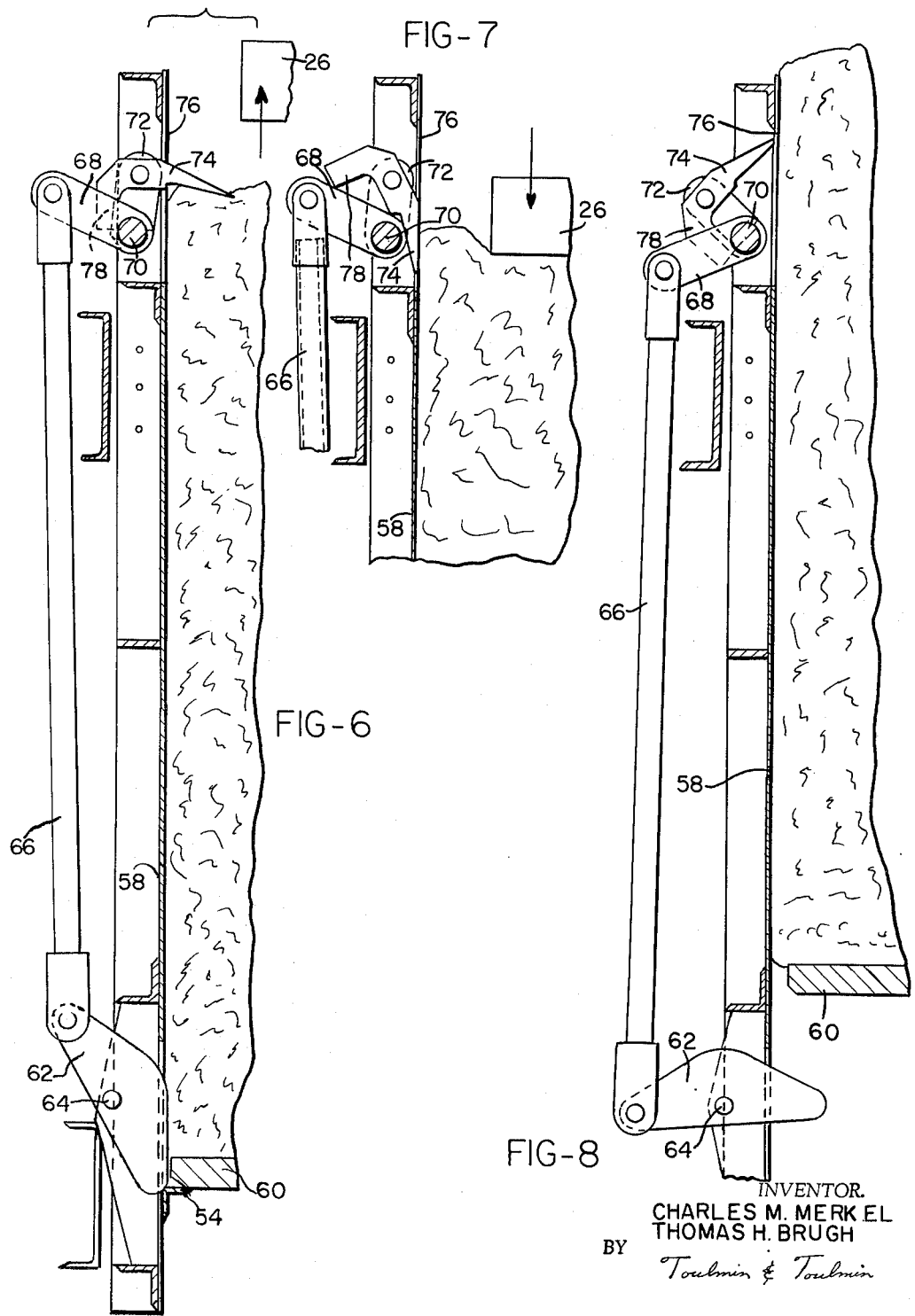

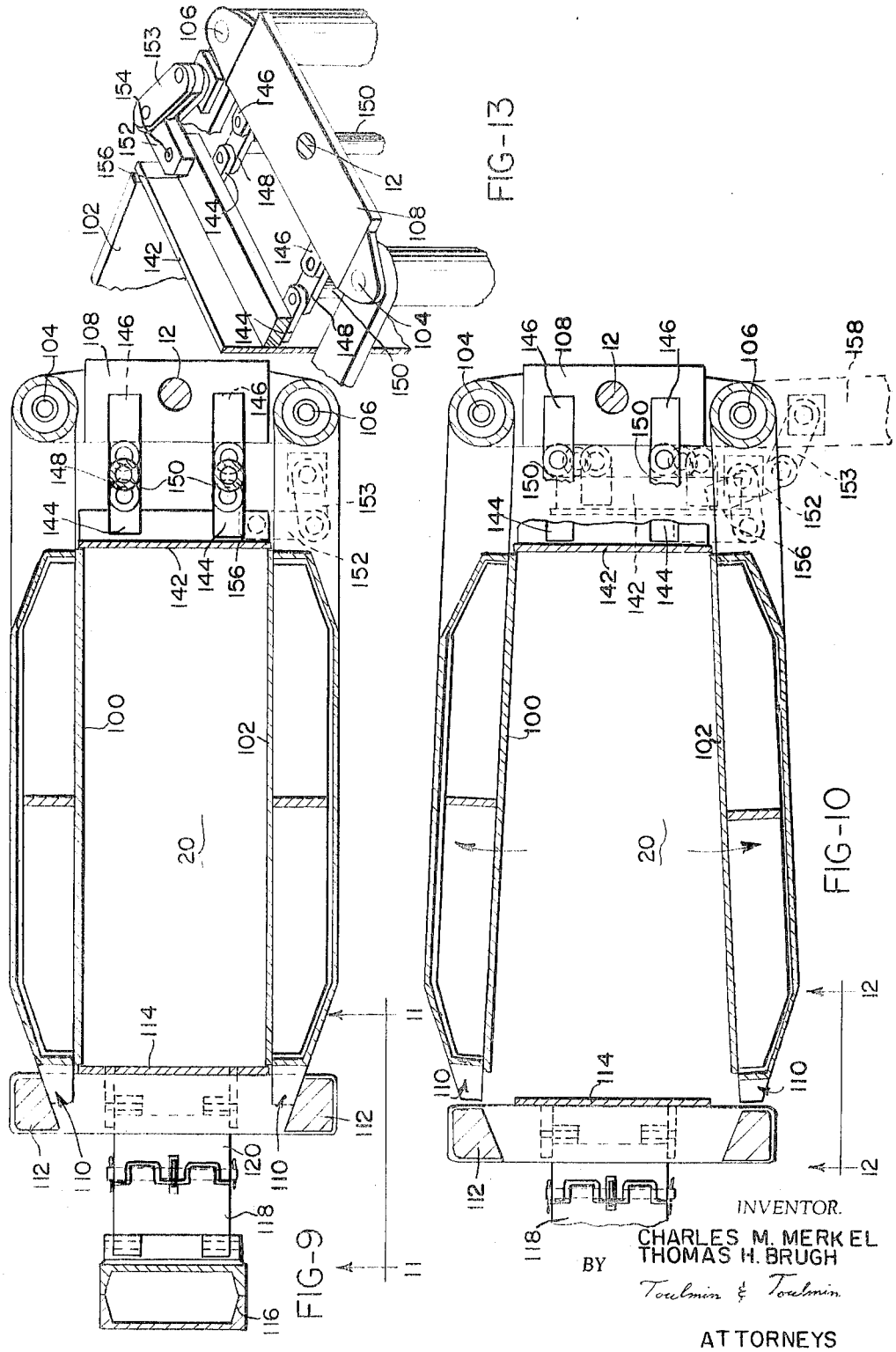

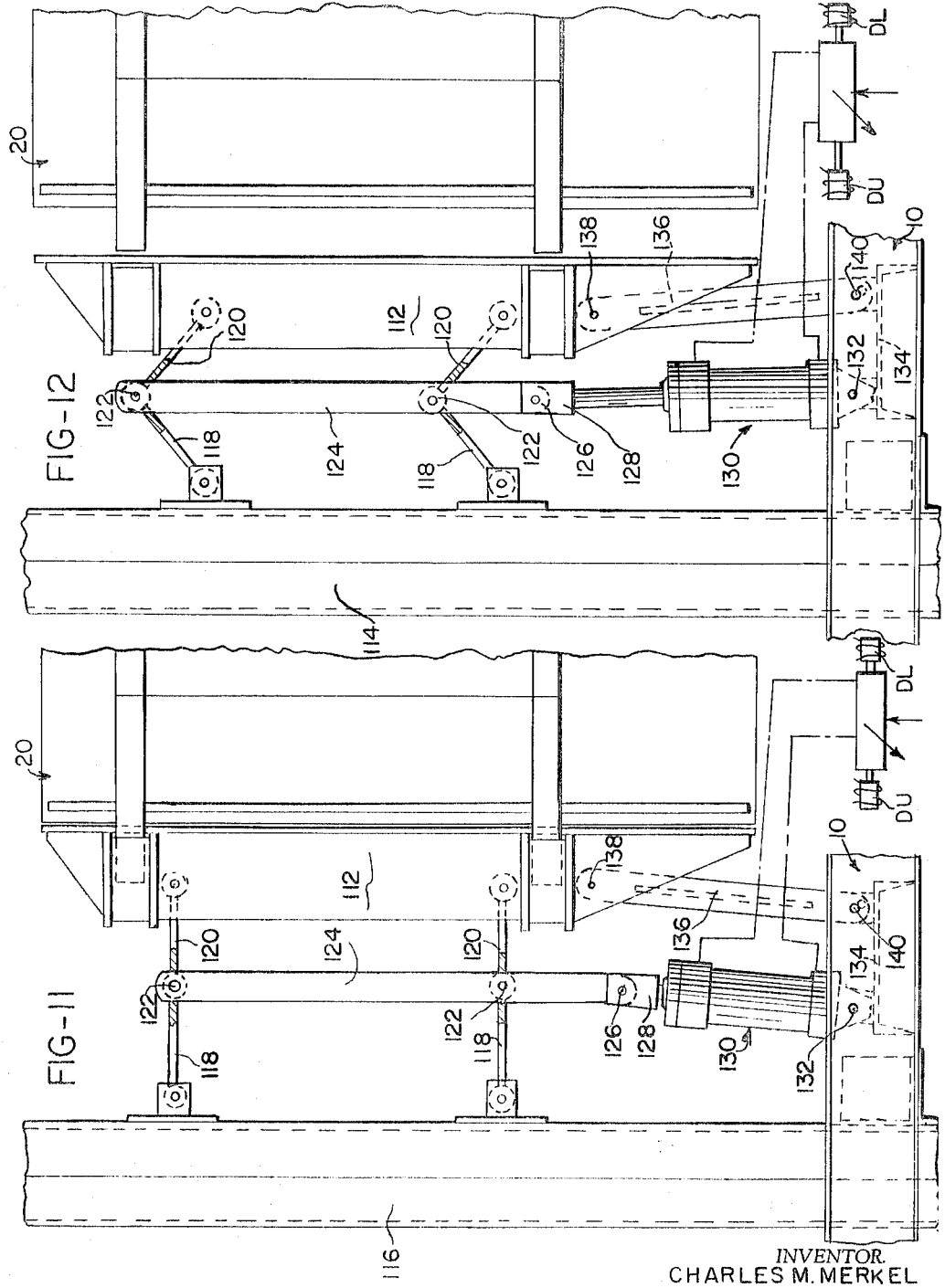

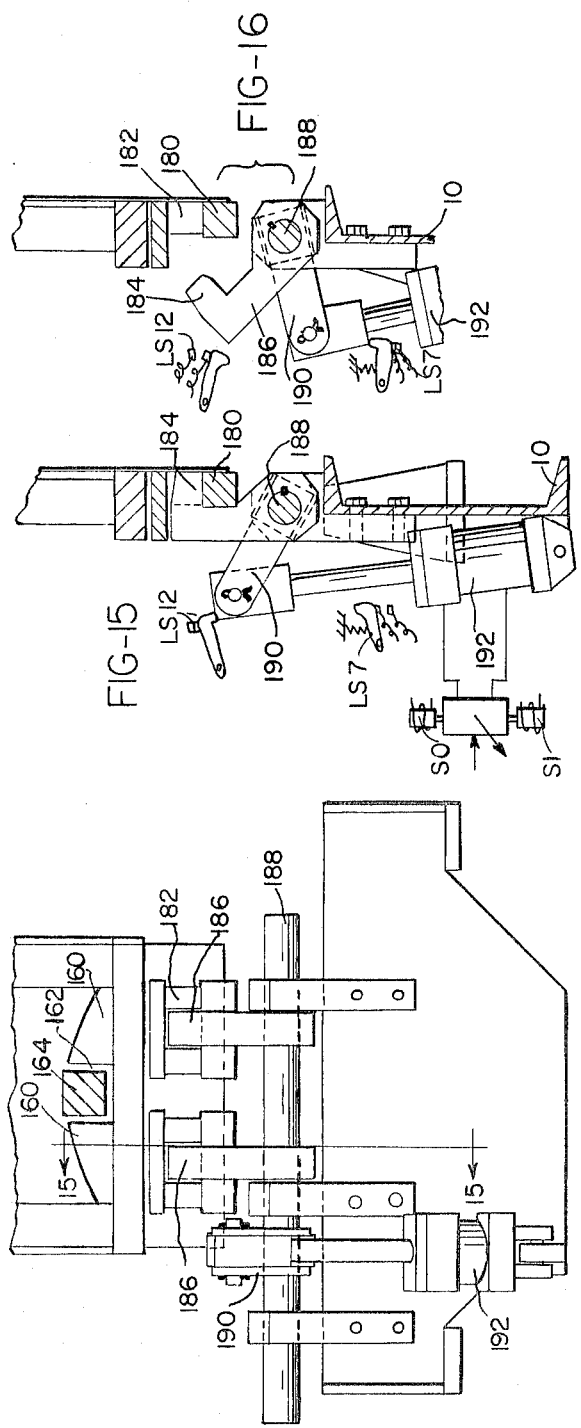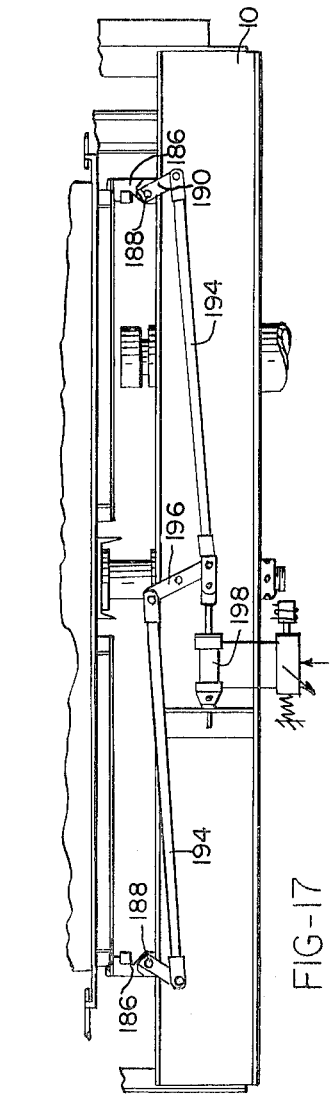

United States Patent Office 3,252,409
Patented May 24, 1966

3,252,409
FIXED BOX COTTON PRESS
Charles M. Merkel, Montgomery, and Thomas H. Brugh, Prattville, Ala., assignors to Continental Gin Company, Prattville, Ala., a corporation of Delaware
Filed Feb. 6, 1964, Ser. No. 343,084
6 Claims. (Cl. 100—223)

This invention relates to an apparatus for baling fibers such as cotton fibers and the like and is particularly concerned with what is known as an up-packing press.

Presses for the baling of fibers such as cotton and the like are known and generally comprise an arrangement having two press boxes rotatable about a common central post so that the boxes can be moved from a first filling position to a second baling position and while the box in filling position is being filled, the material in the other box is being compressed and banded to form a bale. It is in connection with a baling press of this nature that the present invention is concerned.

An object of the present invention is the provision of the baling press of the nature referred to which is more rapid and more convenient to operate than balers heretofore known.

Another object of this invention is to provide an arrangement for baling cotton fibers and the like in which the revolving boxes of the press do not sustain the high baling pressures employed for compacting the bale.

A still further object of this invention is the provision of a revolving box baling press having a separate baling chamber of novel design.

A still further object of this invention is the provision of a rotating box baling press in which the rotating boxes are accurately located and stabilized during the operation of the press.

Still another object of this invention is the provision of a baling press having integrally associated therewith the tramping mechanism that pre-fills the press boxes before they are moved to baling position.

Still another object of this invention is the provision of a baling press having a stationary baling chamber separate from the press boxes and the baling chamber comprising novelly arranged swinging doors and locks therefor.

Another object of this invention is to provide a safe baling press with the rotating charging boxes below floor level and the stationary baling chamber above the floor.

The foregoing objects as well as still other objects and advantages of this invention will become more apparent upon reference to the following specification taken in connection with the accompanying drawings, in which.

FIGURE 2 is a side elevational view looking in from the left side of FIGURE 1;

FIGURE 3 is a side elevational view looking in from the right side;

FIGURE 6 is a vertical sectional view indicated by line 6—6 on FIGURE 1 showing a dog arrangement for holding fibers in the press box when they are positioned downwardly therein by the tramper, but which dog is releaseable automatically when the follower block is moved upwardly in the press box at the beginning of the baling operation;

FIGURE 7 is a fragmentary view similar to FIGURE 6 showing a dog tilted downwardly as tramper foot delivers fibers to the press box;

FIGURE 8 is a view like FIGURE 6, but shows how the dogs release when the follower block is pushed upwardly by the baling ram;

FIGURE 9 is a plan sectional view indicated by line 9—9 on FIGURE 1 showing the fixed baling box according to the present invention and the swinging doors forming the front and back sides thereof and the mechanism for locking the doors closed;

FIGURE 10 is a view like FIGURE 9 which shows the door lock retracted and the swinging doors partly open;

FIGURE 11 is a fragmentary side view of the door lock looking in at the side of FIGURE 9 shown by line 11—11;

FIGURE 12 is a fragmentary side view of the door lock looking in at the side of FIGURE 10 shown by line 12—12;

FIGURE 13 is a perspective view showing the support for the baling box wall at the right end thereof as viewed in FIGURES 9 and 10 in the manner in which this wall is retractable from box closing position;

FIGURE 14 is a view drawn at somewhat enlarged scale as indicated by line 14—14 on FIGURE 1 showing the lock for locking the rotating boxes in index position and showing a stabilizer mechanism associated therewith;

FIGURE 15 is a sectional view indicated by line 15—15 on FIGURE 14 showing a stabilizer dog in operative position and the actuating motor therefor;

FIGURE 16 is a fragmentary view like FIGURE 15 but showing the stabilizer dog rocked away from its operative position;

FIGURE 17 is a fragmentary view showing a modified arrangement for actuating the stabilizer dogs to and from working position;

Figure 4:
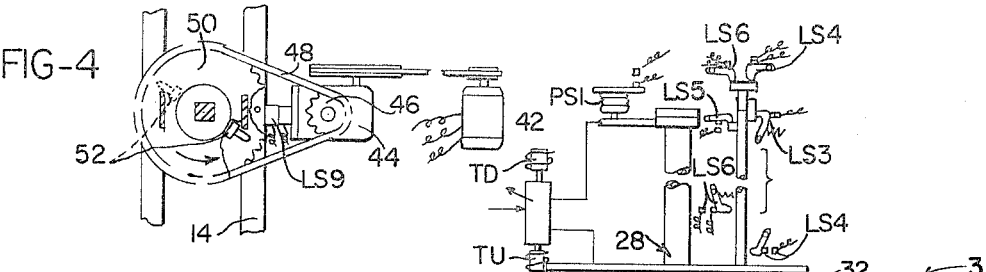
FIGURE 4 is a fragmentary sectional view indicated by line 4—4 on FIGURE 1 showing the drive mechanism by means of which the press boxes are caused to rotate between filling position and baling position.

Referring to the drawings somewhat more in detail and with particular reference to FIGURES 1 through 4, the baling press according to the present invention is an arrangement comprising a frame 10 having a center column 12 and rotatably mounted on center column 12 is a second frame unit 14 carrying the boxes 16 and 18. As opposed to the usual type press, boxes 16 and 18 are not baling boxes, but are boxes that receive cotton to be baled in one position and convey it to a second position, and in said second position, the cotton is removed from the pertaining box and is compressed in a baling box fixed in the frame and separate from boxes 16 and 18.

Figure 1:
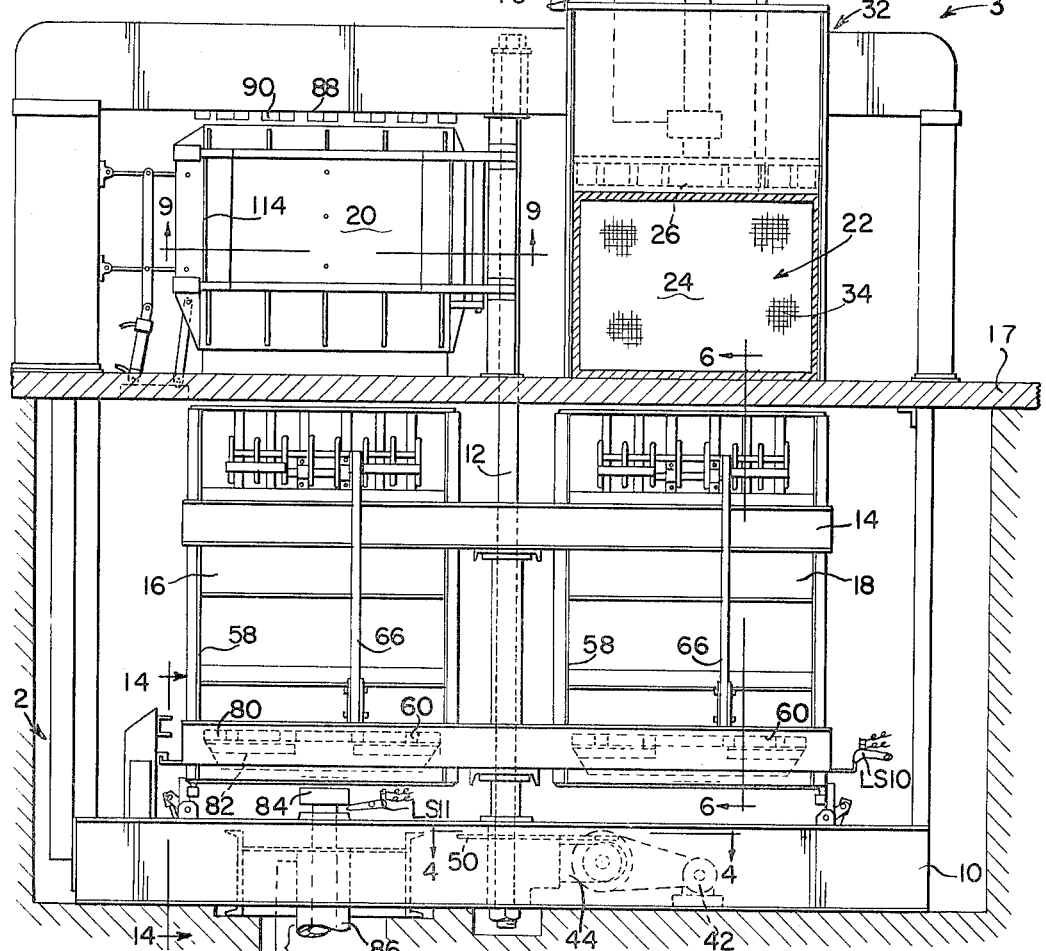
FIGURE 1 is a front elevational view of a baling press according to the present invention.
Figure 5:
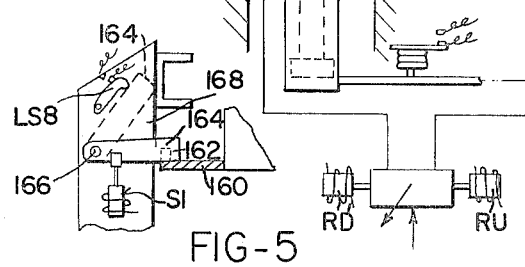
FIGURE 5 is an enlarged fragmentary sectional view showing a lock mechanism and an actuating solenoid therefor associated with the rotating baling boxes.

In FIGURE 1 the baling box is generally designated at 20 and it will be seen to be fixed in the frame and located above box 16, and above the floor 17 when the press is partially submerged below the floor. Floor 17 could also be a walking deck around the baling box 20 and hopper 24.

Box 18 is in fiber receiving position and to this end there is located in frame 10 of the press the fiber feeding arrangement 22 which comprises a vertically extending hopper or passage 24 within which is vertically reciprocable a tramper foot 26. This foot can be actuated by any suitable motor means such as the hydraulic motor means 28 illustrated in the drawings.

In FIGURES 1 and 3 the tramper foot is shown in its uppermost retracted position and in this position a downwardly inclined duct 30 communicating with the hopper or channel 22 on one side is operable for delivering cotton thereto. The lower end of duct 30 is adapted for being closed when the tramper foot moves downwardly by a gate generally designated at 32, which is abuttingly engaged by the tramper foot thereby to lift the gate and uncover the opening when the tramper foot retracts, while closing the opening when the tramper advances. A structure of this nature is illustrated in the Deems Patent No. 3,025,785.

The wall of hopper or passage 24 opposite the open end of downwardly inclined feed duct or chute 30 has an opening therein in which is mounted a screen 34. This opening is also connected with a suction duct 36 on which a suction is drawn by a fan or the like which is generally indicated at 38. The suction at the opening in the hopper is under the control of damper means 40, said damper means opening when the tramper foot is retracted and closing when the tramper starts downwardly. This arrangement is also disclosed in the above identified patent.

The boxes 16 and 18 are adapted for being rotated about center column 12 by a drive motor 42 connected through a speed reducing unit 44 to a sprocket 46 that is, in turn, drivingly connected by chain 48 with a larger sprocket 50 which is connected with frame 14 carrying the boxes 16 and 18. Cam means 52 carried by sprocket 50 cooperates with a limit switch LS9 as will be explained more fully hereinafter to de-energize drive motor 42 as the boxes approach operative position.

The boxes 16 and 18 are of novel construction particularly with respect to the fiber hold-down dog arrangements, which feature is more fully illustrated in FIGURES 6 through 8.

Each box has angle clips 54 secured to the insides of the walls 58 of the boxes and serving to support the follower block 60 at the bottom of each box. Each follower block 60 in its lowermost position engages one leg of a lever 62 pivoted at 64 to the box and pivotally connected at its opposite end to a link 66 extending upwardly along the outside of the box. There is an arrangement of this nature in each side of each box. The upper end of each link 66 is pivotally connected with a lever 68 fixed to a shaft 70 rotatably mounted on the adjacent wall of the pertaining box. Fixed on shaft 70 in axially distributed relation therealong are a plurality of lever members 72 and pivoted to the upper end of each of these lever members is a fiber hold-down dog 74 having an end part extending into the interior of the pertaining box through a suitable aperture 76. The dogs 74 are so arranged that their inner ends will readily yield downwardly as shown in FIGURE 7 to permit fibers to be pushed into the box by tramper foot 26. When the tramper foot retracts, the dogs rock back to their FIGURE 6 position and restrain the fibers so that they do not move upwardly in the box. When the dogs 74 are in their FIGURE 6 position, a dependent end thereof 78 abuts shaft 70 or some other suitable stationary element and prevents the dogs from turning counterclockwise beyond their FIGURE 6 position.

Upon upward movement of follower block 60 as illustrated in FIGURE 8, lever 62 is released and the weight of link 66 and other unbalanced mass of the system will rock link 66 to its FIGURE 8 position, and this will also bring about rocking of shaft 70 to its FIGURE 8 position and this withdraws all of dogs 74 from the pertaining box so that the fibers can be moved upwardly therefrom without any interference from the dogs.

Returning now to FIGURE 1, each follower block 60 is composed of a plurality of parallel spaced members 80 interconnected by a frame work 82 therebeneath, and which frame work is adapted for engagement by the upper end of a ram 84 which is the movable portion of a fluid motor that also comprises cylinder 86. This fluid motor is the baling motor and applies baling pressure to the fibers.

According to the present invention, the fibers in the box located beneath the fixed baling box 20 are pushed into the said box by the baling ram instead of being compacted within the box 16. With this in mind, the box 20 has its upper side closed by a member 88 which, similarly to the follower blocks referred to, is made up of a plurality of members 90 in spaced parallel relation, the spaces between the members coinciding with the spaces between the members 80 of the follower blocks.

This enables bands to be passed about the compressed bale so that it can be banded within the baling box.

The structure of the baling box, which is also novel, will be seen in FIGURES 9 through 13. The baling box 20 as will be seen in the aforementioned figures, has front and back walls or doors 100 and 102, respectively, which are pivotally supported on the upright pivot members 104 and 106, respectively, which are adjacent center post 12 of the press. A support frame 108 is provided for carrying the upright pivot members 104 and 106 on center post 12.

The ends of the front and back walls 100 and 102 opposite their pivotally supported ends are tapered endwardly as indicated at 110 and cooperating therewith is a wedge ring 112 having corresponding tapered inside surfaces so the aforementioned front and back walls can be wedged in closed position as indicated in FIGURE 9. The member 112 also carries one end wall 114 of the baling box.

The member 112, as will best be seen in FIGURES 1 and 9 through 12, is connected with the adjacent upright 116 of frame 10 of the press. This connection is by way of a pair of spaced toggles, each comprising links 118 pivoted to frame member 116 and links 120 pivoted to member 112 and with the links being pivotally interconnected at 122 and to a vertical link member 124 which, in turn, is pivoted at 126 to ram 128 of a fluid motor 130, the cylinder of which is pivoted at 132 to a laterally extending frame member 134 of the press frame 10.

Actuation of fluid motor 130 will cause buckling of the toggle mechanisms to move member 112 from its FIGURES 9 and 11 position to its FIGURES 10 and 12 position. The member 112 is supported during this movement by a member 136 pivoted at 138 to member 112 and at 140 to the aforementioned frame member 134.

At the opposite end of the baling box, namely, the right end as viewed in FIGURES 9 and 10, there is another end wall 142. This end wall is connected with the aforementioned frame 108 that carries pivots 104 and 106 by linkage means consisting of the short links 144 rigidly connected to wall 142 and short links 146 rigidly connected with frame 108 and which links are connected by an intermediate link 148 pivoted to both thereof. There are upper and lower links 148 and these are rigidly interconnected by rods or tubes 150 welded therebetween so that upper and lower links both will move in unison.

The wall 142 is caused to move away from the interior of the baling box when door 102 is opened by a linkage connecting door 102 with wall 142. This linkage takes the form of a first link 152 pivoted at one end to door 102 and pivoted at its other end to a link 153, which, in turn, is pivoted at 154 to wall 142. Link 152 has its end adjacent wall 142 beveled as at 156 so that link 152 can only turn a limited amount about its pivot 154 and thereafter the beveled end 156 of the link will engage wall 142 and the link becomes rigid with the wall.

This is availed of for moving wall 142 rightwardly when door 102 is swung outwardly as indicated in dot-dash outline 158 in FIGURE 10. FIGURE 13 shows the above described linkage in perspective.

The press box construction is such that high pressures can be developed therein with all of the wall parts and the front and back doors being substantially rigidly supported. Following the compacting of fibers in the box, however, all walls of the box can be withdrawn and in particular the front and back doors can be swung open to permit banding of the bale. After banding of the bale, the ram 84 and the follower block resting thereon are retracted and as soon as the box being filled receives its charge of fibers, the boxes 16 and 18 can be indexed and a new bale is ready to be compressed in the baling box.

The indexing of boxes 16 and 18 is accomplished, as mentioned before, by motor 44. The present invention, however, includes means for accurately locating the boxes in indexed position and means for supporting the boxes in indexed position against any substantial deflection on account of working loads imposed thereon.

The locating of the boxes in indexed position is accomplished by an arrangement illustrated in FIGURES 1, 3, 5 and 14. Supported on the indexing assembly at opposite ends thereof are the cam elements 160, which define therebetween a vertical slot 162 adapted for receiving a latch bar 164. This latch bar is pivoted at 166 in a supporting frame 168 and is movable out of locking position by energization of a solenoid S1. De-energization of the solenoid will release the latch bar and upon indexing of the boxes, the latch bar will ride up the inclined surface of cam means 160 and drop into the space between the cam means thereby accurately and positively positioning the boxes in the proper indexed location.

FIGURES 1, 3 and 14 through 17 show a stabilizing arrangement associated with the indexing boxes for holding them steady during operation of the press. On the underneath side of the indexing box assembly at each side are the bar like elements 180 which define sockets 182. These sockets are adapted for receiving nose parts 184 of stabilizing levers 186 fixedly mounted on support shafts 188 that are pivotally carried in press frame 10.

These shafts carry actuating arms 190 for rotation of the shafts between the FIGURE 15 position and the FIGURE 16 position. This is accomplished by the fluid motor means 192 connected between frame 10 and the arms 190.

In the arrangements of FIGURES 14, 15 and 16, a separate fluid motor is pivoted for each for the shafts 188 at each side of the press frame. FIGURE 17 shows an arrangement wherein the shafts 188 are interconnected by linkage means 194 extending laterally of the press and connected to opposite ends of a lever 196 on frame 10. Lever 196 is actuated by a single fluid motor means 198 for rocking shafts 188 to carry the stabilizing elements 186 between operative and inoperative positions.

The baling press according to the present invention operates in the following manner:

The tramper reciprocates and builds up the charge of fibers in the press box therebeneath until a predetermined amount of fibers are therein which can be detected, for example, by the pressure built up on the fibers. When the charge is built up in the baling chamber, the tramper stops just above the press box so that the press boxes can index while, at the same time, the supply of lint from the feed chute into the hopper above the press box being charged is interrupted. Thereafter the press boxes are released from their locked position and rotated 180°. When the indexing of the press boxes is completed, they are again locked in position and the baling ram moves upwardly and transfers the fibers from the press box thereabove into the baling box and compacts the fibers therein so they can be baled to form the completed bale. Thereafter, the press ram is lowered and the bale is removed and the baling box is again locked closed.

During the aforementioned pressing operation, the tramper operation was resumed and a new charge of fibers is being built up in the press box which is now aligned with the tramper. The foregoing operation is carried out repetitively so long as there is a supply of fibers to the baling press.

Figure 18:
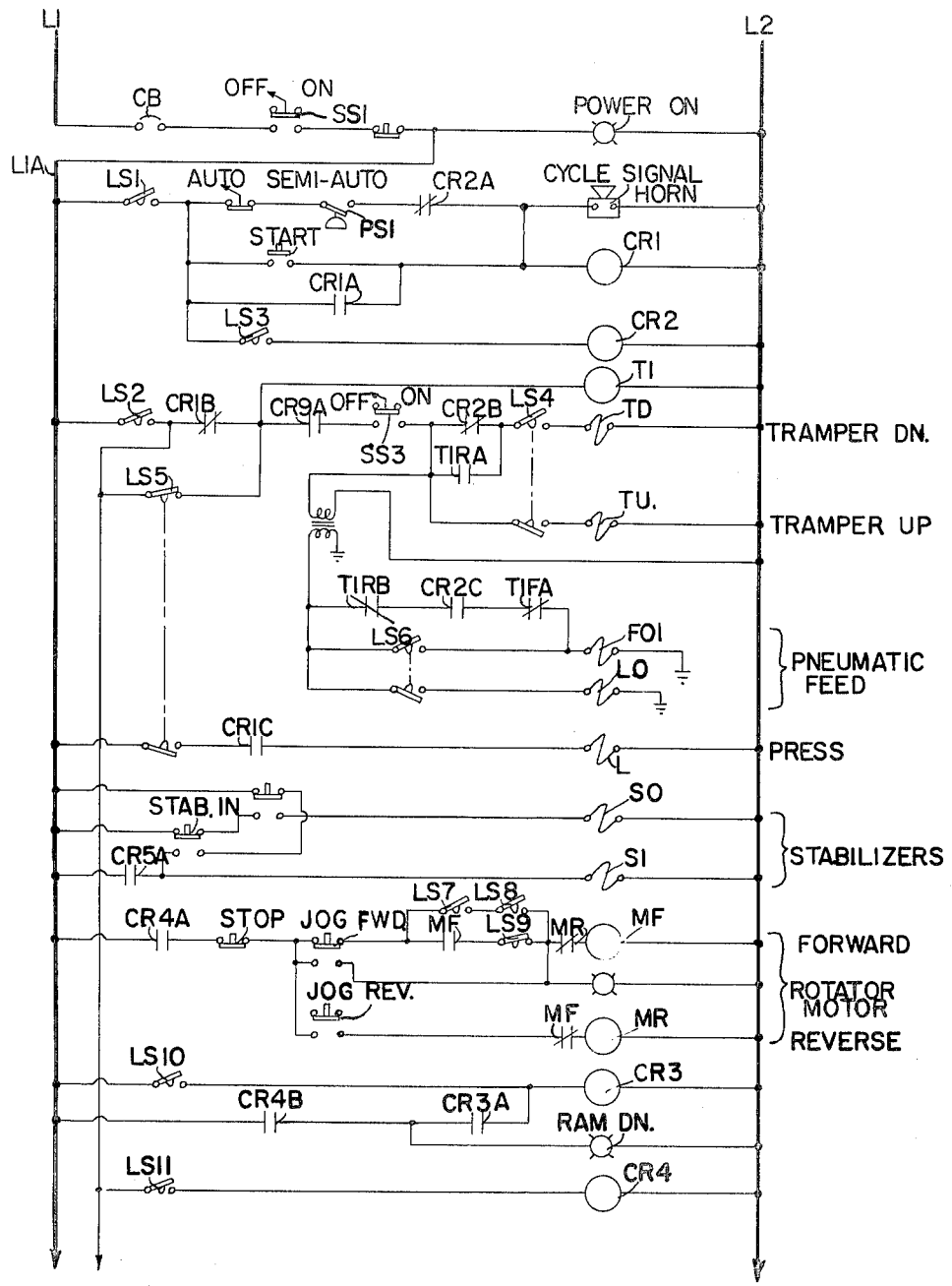
FIGURE 18 is a schematic diagram of a portion of the electric control circuit for controlling the operation of the baling press.
Figure 19:
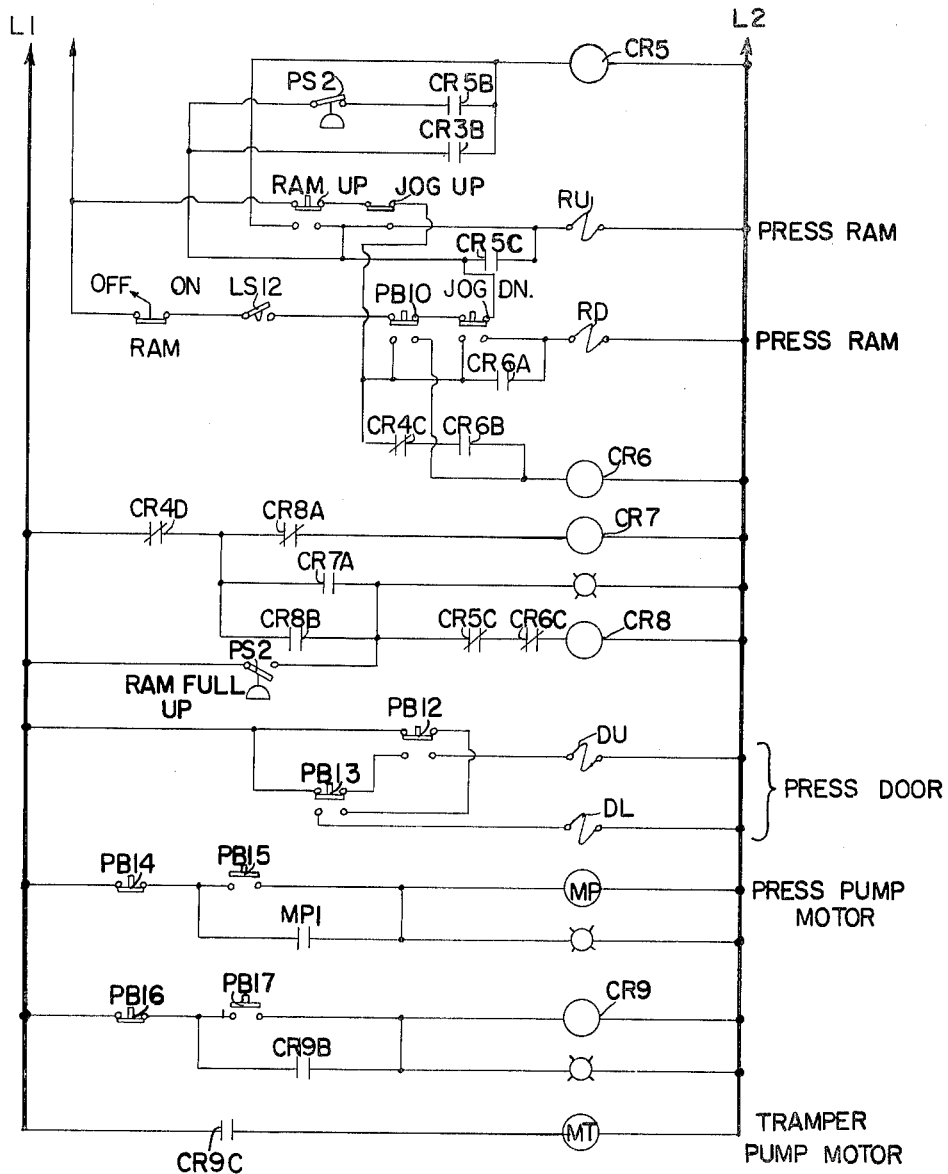
FIGURE 19 is a continuation of the circuit of FIGURE 18.

The control of the press is accomplished by the electric circuit illustrated diagrammatically in FIGURES 18 and 19. To simplify the reading of this circuit, the lines thereof are numbered at the left and there is also indicated at the left the lines on which the various limit switches appear.

On the right side of the diagram are explanatory legends with respect to the operating solenoids and the locations in the diagram of the pressure switches and the relays forming a part of the circuit are also indicated together with the lines of the diagram where the blades of the respective relays appear.

The control circuit is arranged for automatic or manual operation, and when automatically operated, most of the operative steps will occur sequentially and automatically up to a certain point, whereas when the press is operated manually most of the operative steps are carried out manually.

With respect to the diagrams and referring first to the lower portion of FIGURE 19, a pump is provided for supplying hydraulic pressure fluid to the press or baling ram which is comprised of ram 84 and motor 86. The pump for this motor is under the control of a relay MP that can be energized by closing push button PB15 which can be stopped by opening push button PB14. A holding circuit for the relay is provided by a blade MP1 thereof.

Similarly, a fluid pump for the tramper motor 28 is under the control of a relay MT that is energized by closing of relay blade CR9C of relay CR9 that is energized by closing push button PB17, and which can be de-energized by opening push button PB16. Relay CR9 has a holding blade CR9B. This relay furthermore has a third blade CR9A located in the circuit to the valve control solenoids of the control valve for the tramper motor so that this valve is inoperative except when the pump is running, which occurs when relay CR9 is energized.

The baling box doors illustrated in FIGURES 9 through 12 are also operated manually by controlling the supply of fluid to motor 130 by way of a control valve which has a door unlock solenoid DU and a door lock solenoid DL. Solenoid DU can be energized to lock the doors by closing push button PB12 and solenoid DL can be energized to lock the doors by closing push button PB13.

The remainder of the circuit illustrated is automatic and can be best read from the top of FIGURE 18 downwardly.

Operation of the press is initiated by closing switch SS1 which conveys power through a circuit breaker to the left side of the line indicated at L1A. The right side of the line is indicated at L2.

When the press boxes are in indexed position, switch LS1 is closed, and upon the tramper encountering a predetermined resistance to movement, pressure switch PS1 will close and energize relay CR1 which will hold through its blade CR1A. Closing of CR1 will open its blade CR1B in circuit with the tramper down control solenoid TD and tramper up solenoid TU. This resistance to the tramper will, of course, occur during the downward movement thereof, but opening of blade CR1B will not stop the tramper because it will remain energized through the closed side of limit switch LS5. The tramper will thus complete its downward movement and will move back upwardly until it clears the top of the press box at which time LS5 is operated and the side thereof in circuit with the tramper control solenoids will open and another side thereof in circuit with the unlock solenoid L will close.

Because of the now closed blade CR1C locking, solenoid L will be energized and withdraw latch bar 164. Also, solenoid S0 is energized to withdraw the stabilizers from engagement with the press box structure, these stabilizers being indicated at 184 in FIGURES 14, 15 and 16. The withdrawing of the latch bar and the pulling out of the stabilizers will close limit switches LS7 and LS8 and this will energize the rotator motor 42 to rotate the press boxes. The direction of rotation of the rotator motor is determined by the direction in which the boxes last moved and is under the control of the relays MF for rotation in one direction and MR for rotation in the opposite direction.

Energization of these relays can only be accomplished if blade CR4A of relay CR4 is closed indicating that relay CR4 is energized, which in turn, is effected only when limit switch LS11 is closed, which is brought about by ram 84 in its down position.

As the press boxes index, limit switch LS2 first opens and then limit switch LS1 opens. The opening of limit switch LS2 prevents the operation of any of the feed and tramping components and the like while the press boxes are indexing. The delay in opening limit switch LS1 will hold relay CR1 energized long enough for the boxes to index away from the latch arm whereupon opening of limit switch LS1 will release the latch arm, and it will then drop into position when the boxes are fully indexed.

As the press rotates a cam driven by the rotator motor as by being on the sprocket connected with the press box, normally opens limit switch LS9 and this will stop the rotator motor at the proper position for the press boxes to lock in place. Before the press reaches locked position, a cam carried by the press box structure will engage and close limit switch LS10 thereby energizing relay CR3 which holds through contacts CR4B and CR3A. The particular function of this relay will be explained subsequently.

The press boxes are now indexed and are locked in place and limit switches LS1 and LS2 are now again held closed by the cams on opposite sides of the latch bar. With these limit switches held closed, the tramper up solenoid TU is again energized and the tramper moves upwardly, and at the top will close limit switch LS3 to energize relay CR2. Closing of relay CR2 will open blades CR2B thereof so that the tramper down solenoid TD is now under the control of timer blade TR1A. This timer was picked up with the closing of switch LS2.

Limit switch LS6 is tripped on the upstroke of the tramper and this effects energization of solenoid FO1 which creates a supply of suction to the pneumatic feed. This gives a short suction to empty the lint slide and thereafter the tramper will again commence its cycling.

With respect to the operation of the tramper, relay CR2 is closed on each up stroke of the tramper for about the top six inches of travel thereof by closing of switch LS3, and this will cause opening of blades CR2A in circuit with pressure switch PS so that this switch will not be closed by the pressure surge which occurs when the tramper starts to move downwardly.

With respect to the aforementioned relay CR3, this provides an interlock feature because when CR3 is energized, its blade CR3B is closed and this will bring about energization of relay CR5 when limit switch LS12 is closed showing that the stabilizers are completely in. Thereafter, when the press is indexed and relay CR3 drops out, CR5 will hold through its blade CR5B and pressure switch PS2 and blade CR5C will close and ram 84 will move up because of energization of its control solenoid RU. The ram will continue to move up until pressure switch PS2 opens, thereby de-energizing relay CR5.

When the ram moved upwardly, switch LS11 opened thus dropping out relay CR4 whereby its contact CR4D closes and energizes relay CR7, which has a single pulsating blade CR7A which controls an indicating light.

When the ram 84 reaches the top of its stroke, the open blade of pressure switch PS2 closes and supplies energizing current to relay CR8 which holds through its blade CR8B. Blade CR8A opens and drops out relay CR7 and the aforementioned signal light stops pulsating and burns steadily.

The press ram is brought down by operating PB10 which will effect energization of relay CR6 which will open its blade CR6C thus dropping out relay CR8 again effecting energization of relay CR7 so that a pulsating light is again had until ram 84 reaches the bottom of its stroke. When the ram bottoms switch LS11 again energizes relay CR4 and drops out relays CR6, CR7 and CR8. Relay CR4 through another blade CR4B will illuminate another signal light showing that the ram is completely down. Contact CR4A referred to previously prepares the circuit for the relays that control the rotator motor and the press.

The operation of the press is thus completed and another cycle can now be carried out.

It will be appreciated that, except for the opening of the press box doors and the banding of the bale and the removing of the bale from the press, and the lowering of the press ram, all of the operations are automatic so that no damage to the press or operating personnel can occur. The press is thus rapid and sure in operation, and bales of uniform size can be made continuously and rapidly.

The provision of the baling box separate from the indexing press boxes is a feature that is of merit because the press boxes do not have to withstand high baling forces and the press box itself, being considerably smaller than the press boxes can be adequately strong without undue expense.

The arrangement of the baling press of the present invention wherein the rotating press boxes are below floor level is of particular merit because of the safety which this affords to personnel working near the press and for the additional reason that it places the baling chamber which is above floor level at a convenient height for the workmen. All parts of the machine above the floor level are either non-rotating and free of swinging doors and the like as in the case of the tramper station toward the right side of FIGURE 1, or have slow moving manually operated doors as in the case of the baling station on the left side of FIGURE 1. For all intents and purposes, both of these stations are completely closed and there is no likelihood of injury to personnel working near the press.

It will be understood that this invention is susceptible to modifications in order to adapt it to different usages and conditions; and accordingly, it is desired to comprehend such modifications within this invention as may fall within the scope of the appended claims.

What is claimed is:

1. A baling press comprising: a frame having a central column and a filling station and a baling station therein, two charging boxes adapted to be pivoted about said column and to be positioned and locked at each of said stations, stabilizer and locking means at said stations to accurately position and lock said boxes at said stations, means for simultaneously moving said boxes from one of said stations to the other station, means for filling said boxes with material to be baled when positioned at said filling station comprising, pneumatically operated means for delivering the said material to a said box at said filling station, and hydraulically operated tramper means to partially compact said material therein, said means for filling said boxes being responsive to a predetermined amount of material filled in said boxes to de-energize said tramper means, control means responsive to said means for filling said boxes for disengaging said stabilizer and locking means and for rotating said boxes upon filling of a box at said filling station, a baling box mounted in said frame over said baling station to receive the material from the charging box at said baling station, and means for transferring the said material to said baling box from one of said charging boxes when positioned at said baling station and for compacting the transferred material in said baling box, said control means also being adaptable to initiate the filling of the other charging box during the compacting of the material in the baling box.

2. The baling press as claimed in claim 1, in which said baling box has four movable sides, two of said sides being pivotally mounted at one end in said frame and having tapered ends connected with said sides at the other end, a third side linked to said two sides and adapted to move away from the center of said baling box upon the opening of said two sides and to move toward said center and be locked in place upon the closing of said two sides, a fourth side having wedge means connected therewith for cooperatively engaging said tapered ends, and actuating means to move said wedge means into engagement with said tapered ends to lock said four sides in a closed position.

3. A baling press according to claim 1 in which said filling station includes means for feeding fibers beneath said tramper means and operable for effecting the said feeding only when the tramper means is fully retracted, feed means for de-energizing said tramper means including means for interrupting retracting movement of the tramper means when it clears the charging box being filled and before the fiber feeding means is made operative.

4. In a baling press a frame comprising a vertical column, carriage means rotatable on said column and having therein a pair of vertically arranged charging boxes open at the top, indexing means for driving said carriage for carrying each charging box from a first working station to a second working station and then back to said first working station, latch means to latch the carriage in each of its indexed positions, and stabilizer means carried by the frame engageable with said carriage for preventing tilting of the carriage when in its indexed positions, said stabilizer means comprising substantially vertical levers pivoted to the frame and located for engaging said carriage in the region of each charging box when the carriage is in indexed position, each lever having a substantially horizontal nose portion at the upper end, and said carriage having apertured means rigid therewith for receiving said nose portions.

5. A baling press comprising: a frame having a column vertically fixed therein and a filling station and a baling station therein, two charging boxes rotatable about said column from said filling station to said baling station, means for simultaneously rotating said boxes from one of said stations to the other station, means for filling said boxes with material to be baled when positioned at said filling station; a baling box mounted in said frame over said baling station, said baling box having four movable sides, two of said sides being pivotally mounted at one end in said frame and having tapered ends connected with said sides at the other end, a third side linked to said two sides and adapted to move away from the center of said baling box upon the opening of said two sides and to move toward said center to be locked in place upon the closing of said two sides, a fourth side having wedge means connected therewith for cooperatively engaging said tapered ends, and actuating means to move said wedge means into engagement with said tapered ends to lock said four sides in a closed position; means for transferring the said material to said baling box from one of said charging boxes when positioned at said baling station while the other said charging box is being filled, and means for compacting said material in said baling box.

6. A baling press comprising: a frame having a column vertically fixed therein and a filling station and a baling station therein, two charging boxes rotatable about said column from said filling station to said baling station, means for simultaneously rotating said boxes from one of said stations to the other station, means for filling said boxes with material to be baled when positioned at said filling station; a baling box mounted in said frame over said baling station, said baling box having four movable sides, two of said sides being pivotally mounted at one end in said frame and having tapered ends connected with said sides at the other end, a third side linked to said two sides and adapted to move away from the center of said baling box upon the opening of said two sides and to move toward said center and be locked in place upon the closing of said two sides, a fourth side having wedge means connected therewith for cooperatively engaging said tapered ends, and actuating means to move said wedge means into engagement with said tapered ends to lock said four sides in a closed position; said actuating means comprising: a pair of spaced toggles, each toggle having two links pivotally interconnected at their inner ends with the outer end of one link pivotally connected to said frame and the outer end of the other link pivotally connected to said fourth side, a vertical link member pivotally connected to the said inner ends of the links of said toggles, and a fluid motor pivotally mounted on said frame and on one end of said vertical link; means for transferring the said material to said baling box from one of said charging boxes when positioned at said baling station while the other said charging box is being filled, and means for compacting said material in said baling box.

References Cited by the Examiner

UNITED STATES PATENTS

| 462,930 | 11/1891 | Reeder | 100—223 X |
| 813,603 | 2/1906 | Washington | 100—255 X |
| 995,932 | 6/1911 | Washington | 100—223 |
| 1,093,526 | 4/1914 | Boddie | 100—223 X |
| 1,313,228 | 8/1919 | Minnich | 100—255 |
| 2,209,740 | 7/1940 | Steinhauer | 100—223 X |
| 2,241,006 | 5/1941 | Smith et al. | 100—223 X |
| 2,963,959 | 12/1960 | Van Doorn et al. | 100—223 X |
| 3,025,785 | 3/1962 | Deems | 100—215 X |

FOREIGN PATENTS 22,173  10/1961  East Germany.

WALTER A. SCHEEL, *Primary Examiner.*

LOUIS O. MAASSEL, *Examiner.*